United States Patent
Park et al.

(10) Patent No.: US 9,559,370 B2
(45) Date of Patent: Jan. 31, 2017

(54) LITHIUM AIR BATTERY SYSTEM

(71) Applicant: SK Innovation Co., Ltd., Seoul (KR)

(72) Inventors: Myoung Gu Park, Daejeon (KR); Kyong Sik Kim, Daejeon (KR); Hee Young Sun, Daejeon (KR); Dock Young Yoon, Daejeon (KR); Sang Jin Kim, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 167 days.

(21) Appl. No.: 14/379,942

(22) PCT Filed: Dec. 18, 2012

(86) PCT No.: PCT/KR2012/011083
§ 371 (c)(1),
(2) Date: Aug. 20, 2014

(87) PCT Pub. No.: WO2014/061865
PCT Pub. Date: Apr. 24, 2014

(65) Prior Publication Data
US 2015/0030940 A1     Jan. 29, 2015

(30) Foreign Application Priority Data

Oct. 15, 2012   (KR) .................. 10-2012-0114112

(51) Int. Cl.
| | |
|---|---|
| *H01M 8/04276* | (2016.01) |
| *H01M 12/06* | (2006.01) |
| *H01M 12/08* | (2006.01) |
| *H01M 8/04* | (2016.01) |

(52) U.S. Cl.
CPC ......... *H01M 8/04276* (2013.01); *H01M 12/06* (2013.01); *H01M 12/08* (2013.01); *H01M 2220/20* (2013.01); *H01M 2250/20* (2013.01); *H01M 2300/0017* (2013.01); *Y02E 60/50* (2013.01)

(58) Field of Classification Search
CPC ......... H01M 12/08; H01M 8/04; H01M 2/36; H01M 2/38; H01M 2/40
USPC ................................................ 429/402–407
See application file for complete search history.

(56) References Cited

U.S. PATENT DOCUMENTS

| | | | |
|---|---|---|---|
| 4,528,248 A | 7/1985 | Galbraith | |
| 5,093,213 A | 3/1992 | O'Callaghan | |
| 5,716,726 A | 2/1998 | Cheiky | |
| 2007/0137482 A1 | 6/2007 | Xu et al. | |
| 2010/0151336 A1* | 6/2010 | Nakanishi | H01M 6/14 429/407 |

FOREIGN PATENT DOCUMENTS

| | | |
|---|---|---|
| JP | 61502850 A | 12/1986 |
| JP | 63314782 A | 12/1988 |
| JP | 1163977 A | 6/1989 |
| JP | 210671 A | 1/1990 |

(Continued)

*Primary Examiner* — James Lee
(74) *Attorney, Agent, or Firm* — The Webb Law Firm (57) ABSTRACT

Provided is a lithium air battery system, and more particularly, a lithium air battery system capable of stably and continuously operating a lithium air battery by recovering an electrolytic solution evaporated in the lithium air battery and injecting the recovered electrolytic solution into the lithium air battery.

8 Claims, 5 Drawing Sheets

(56) References Cited

FOREIGN PATENT DOCUMENTS

| | | | |
|---|---|---|---|
| JP | 6176776 | A | 6/1994 |
| JP | 9262405 | A | 10/1997 |
| JP | 1098020 | A | 4/1998 |
| JP | 2002535818 | A | 10/2002 |
| JP | 200932400 | A | 2/2009 |
| JP | 2011258489 | A | 12/2011 |
| JP | 2012101225 | A | 5/2012 |
| KR | 1998019523 | A | 6/1998 |
| KR | 1020110101891 | A | 9/2011 |

* cited by examiner

LITHIUM AIR BATTERY SYSTEM

TECHNICAL FIELD

The present invention relates to a lithium air battery system, and more particularly, to a lithium air battery system capable of improving performance and reliability and obtaining an economical effect by facilitating charging and discharging.

BACKGROUND ART

Recently, due to an increase in emission of carbon dioxide according to consumption of fossil fuel, a sudden change in crude oil prices, and the like, technology development for converting gasoline and diesel as an energy source for a vehicle into electric energy has been receiving attention. An electric vehicle has been commercialized and thus there is a need to increase capacity and energy density of a battery, in detail, a lithium ion battery which is a battery for long distance driving of the electric vehicle. However, the current lithium ion battery has a limited battery capacity and therefore has a difficulty in long distance driving. Therefore, a lithium air battery having larger capacity and higher energy density than the lithium ion battery in theory has been receiving attention.

The lithium air battery has a battery having a cathode using oxygen in air as an active material and is a battery which may be charged and discharged in response to an oxidization and reduction reaction of oxygen in the cathode.

Generally, the lithium air battery includes an anode in which lithium ions may be adsorbed and emitted, a cathode including an oxidization and reduction catalyst of oxygen using oxygen in air as a cathode active material, and a lithium ion conductive medium disposed between the cathode and the anode.

Further, the lithium air battery has a theoretical energy density of 3,000 Wh/kg or more, which corresponds to energy density approximately 10 times larger than that of the lithium ion battery. Further, the lithium air battery may be eco-friendly and may have more improved stability than that of the lithium ion battery.

However, the lithium air battery has a problem in that an electrolyte solvent of an electrolyte part is evaporated. The electrolyte solvent is evaporated inside the lithium air battery. Therefore, ion conductivity of the electrolyte inside the lithium air battery is not only reduced but performance of the lithium air battery is also degraded, and an operation of the lithium air battery abruptly ends and thus the lithium air battery may be instable. Therefore, a lithium air battery system capable of ensuring the stability of the lithium air battery is required.

DISCLOSURE

Technical Problem

An object of the present invention is to provide a lithium air battery system capable of improving stability of a lithium air battery by including a lithium air battery electrolyte solvent recovery apparatus which may recover an electrolyte solvent evaporated inside the lithium air battery.

Technical Solution

In one general aspect, a lithium air battery system includes: a lithium air battery; a gas intake pipe into which a mixed gas of electrolyte solvent steam evaporated in the lithium air battery and air is introduced; a reactor having a space part disposed therein and connected to the gas intake pipe to introduce the mixed gas of electrolyte solvent steam and air into the internal space part; an electrolyte solvent filter part disposed inside the reactor to separate the electrolyte solvent from the mixed gas of electrolyte solvent and air; a recovery part communicating with the space part of the reactor and disposed under the reactor; and a lithium air battery electrolyte solvent recovery apparatus including an electrolyte solvent transfer pipe and a check valve which transfer the electrolyte solvent recovered to the recovery part to the lithium air battery.

The lithium air battery system may further include: a gas exhaust pipe having one end connected to the reactor to discharge gas passing through the electrolyte solvent filter part.

The electrolyte solvent filter part may include a first filter having a sieve form and a second filter having a pad form.

The electrolyte solvent filter part may further include fixed walls having a plate form which are disposed inside the reactor and fix the first filter and the second filter.

The electrolyte solvent filter part may be provided with the plurality of fixed walls parallel with each other in a height direction of the reactor and may be disposed so that the fixed walls are spaced apart from each other.

In the electrolyte solvent filter part, a portion of the fixed wall may be fixed to an upper portion of the reactor, the remaining portion thereof may be fixed to a lower portion of the reactor, and the fixed wall fixed to the upper portion of the reactor and the fixed wall fixed to the lower portion of the reactor may be alternately disposed.

In the electrolyte solvent filter part, the first filter and the second filter may be fixed between the fixed walls and may be alternately disposed.

The electrolyte solvent may be an organic electrolyte solvent or an aqueous electrolyte solvent.

Advantageous Effects

According to the exemplary embodiments of the present invention, the lithium air battery system may recover the electrolyte solvent evaporated inside the lithium air battery and inject the recovered electrolyte solvent into the lithium air battery to stably and continuously operate the lithium air battery and may recover the electrolyte solvent only by the simple apparatus to make the lithium air battery electrolyte solvent recovery apparatus simple and obtain the economical effect.

DESCRIPTION OF DRAWINGS

The above and other objects, features and advantages of the present invention will become apparent from the following description of preferred embodiments given in conjunction with the accompanying drawings, in which.

BEST MODE

Hereinafter, a technical spirit of the present invention will be described in more detail with reference to the accompanying drawings. However, the accompanying drawings are only examples shown in order to describe the technical idea of the present invention in more detail. Therefore, the technical idea of the present invention is not limited to shapes of the accompanying drawings.

Figure 1:
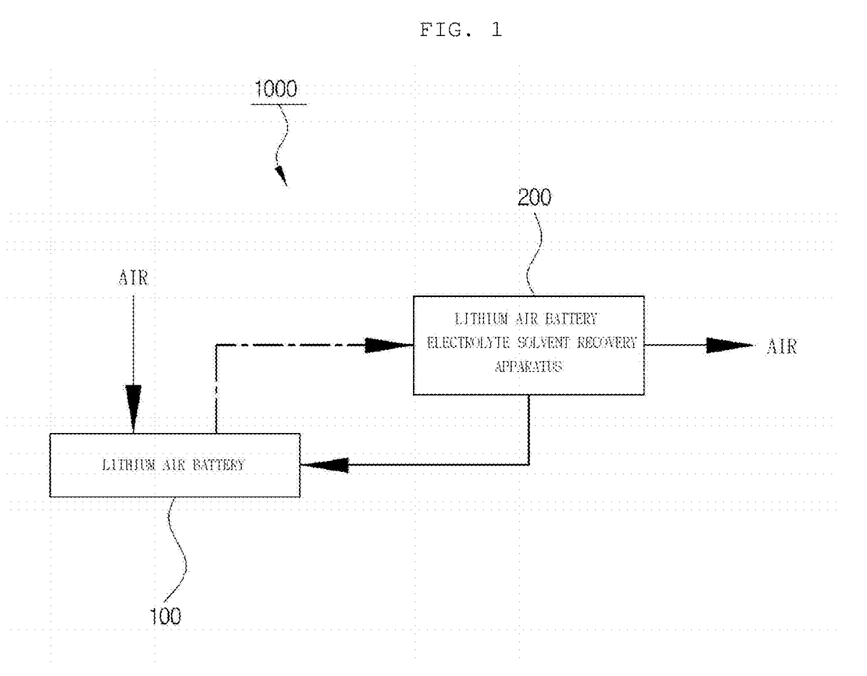
FIG. 1 is a block diagram of a lithium air battery system according to an exemplary embodiment of the present invention.

FIG. 1 is a block diagram illustrating a lithium air battery system 1000 according to an exemplary embodiment of the present invention. As illustrated in FIG. 1, the lithium air battery system 1000 according to the exemplary embodiment of the present invention largely includes a lithium air battery 100 and a lithium air battery electrolyte solvent recovery apparatus 200.

Figure 2:
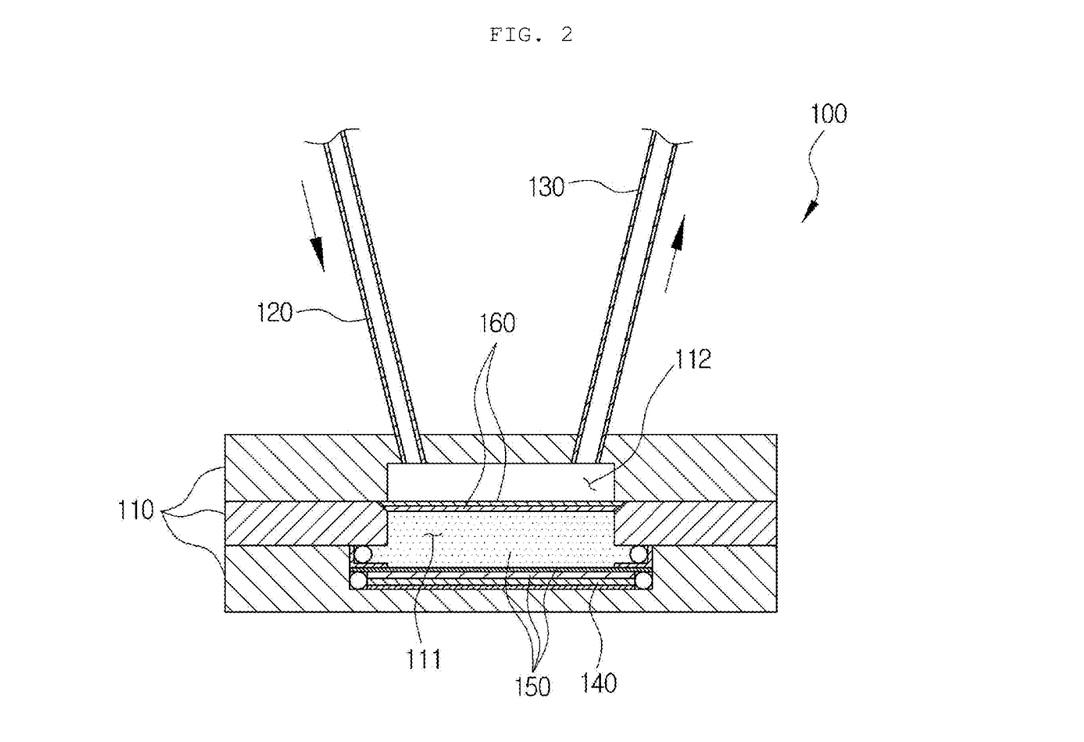
FIG. 2 is a diagram schematically illustrating the lithium air battery according to the exemplary embodiment of the present invention.

As illustrated in FIG. 2, first, the lithium air battery 200 is a battery which may be charged and discharged by an oxidation and reduction reaction of oxygen using oxygen in air as an active material in a porous cathode 160 due to the introduction of air into the battery and includes a housing 110, lithium metal 140, an electrolyte part 150, porous cathodes 160, an air receiving part 112, an air intake pipe 120, and an air exhaust pipe 130.

The housing 110 has a receiving part 111 disposed therein, in which the receiving part 111 of the housing 110 receives the lithium metal 140, the electrolyte part 150, and the porous cathodes 160. Further, in the housing 110, the air receiving part 112 is disposed on the porous cathode 160 and the air intake pipe 120 and the air exhaust pipe 130 are connected to the air receiving part 112.

In this case, the lithium metal 140 is disposed under the receiving part 111, the porous cathodes 160 are disposed to be spaced apart from each other over the lithium metal 140, the electrolyte part 150 is disposed between the lithium metal 140 and the porous cathode 160 to serve to transfer lithium ions between the lithium metal 140 and the porous cathode 160. The electrolyte part 150 may include a separator membrane which adheres to an upper portion of the lithium metal 140 and includes an organic electrolyte, a solid electrolyte which adheres to an upper portion of the separator membrane, and a water-soluble electrolyte which is filled between the solid electrolyte and the porous cathode 160.

Further, the porous cathode 160 may be formed of a gas diffusion layer (GDL) and a catalyst layer. In this configuration, the porous cathode 160 is coupled to seal an opened lower portion of the air receiving part 112 in the housing 110 and may be coupled so that the gas diffusion layer is disposed on an upper portion of the porous cathode 160 and the catalyst layer is disposed on a lower portion thereof. Therefore, the porous cathode 160 may be configured to diffuse air received in the air receiving part 112 through the gas diffusion layer and cause an oxidation and reduction reaction of oxygen in air with the lithium ions in the catalyst layer.

That is, the lithium air battery 100 is charged and discharged by the oxidation and reduction reaction of air introduced into the air intake pipe 120 with the lithium metal 140, in which the lithium metal 140 becomes an anode and the porous cathode 160 becomes a cathode. Meanwhile, the lithium air battery 100 is configured to have the electrolyte part 150 disposed between the lithium metal 140 and the porous cathode 160.

Here, an electrolyte solvent is evaporated during the charging and discharging of the lithium air battery 100 and the evaporated electrolyte solvent is discharged from the air receiving part 112 to the outside along the air exhaust pipe 130. Therefore, when the electrolyte solvent is continuously evaporated, performance of the lithium air battery is degraded, which may be a factor of stopping an operation thereof. In this case, the evaporated electrolyte solvent may be an organic electrolyte solvent or an aqueous electrolyte solvent.

Figure 3:
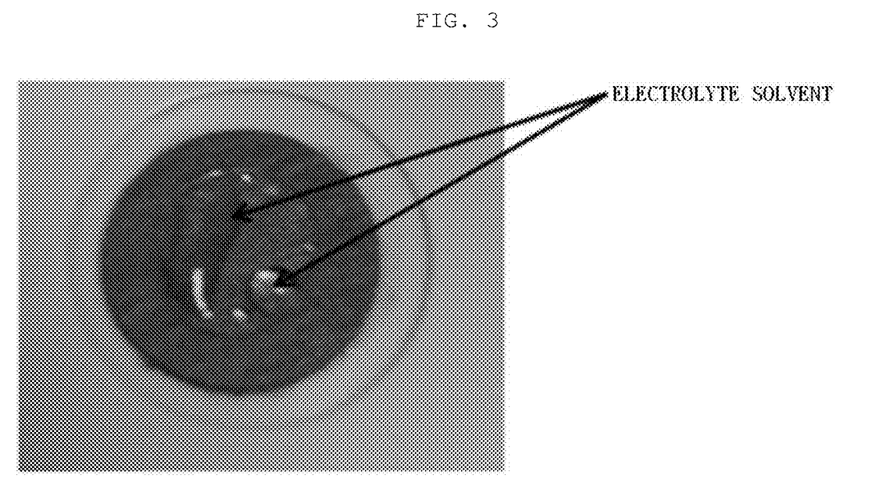
FIG. 3 is a photograph illustrating a porous cathode of the lithium air battery according to the exemplary embodiment of the present invention.

FIG. 3 illustrates the porous cathode 160 of the lithium air battery 100 according to the exemplary embodiment of the present invention after the charging and discharging are progressed. As illustrated in FIG. 3, the lithium air battery 100 is charged and discharged and then the electrolyte solvent is leached from the porous cathode 160. That is, the electrolyte solvent leached in the upper portion of the porous cathode 160 is evaporated in the air receiving part 112 and is discharged to the outside through the air exhaust pipe 130. Therefore, the lithium air battery system 1000 according to the exemplary embodiment of the present invention includes the lithium air battery electrolyte solvent recovery apparatus 200 which may recover the evaporated electrolyte solvent and inject the recovered electrolyte solvent into the lithium air battery 100 again.

Figure 4:
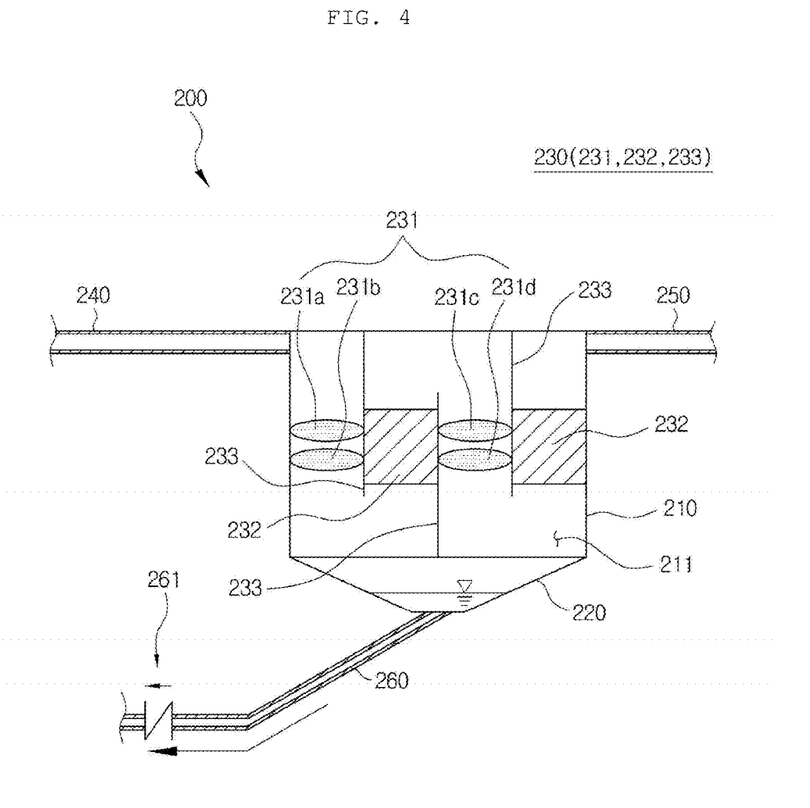
FIG. 4 is a diagram schematically illustrating a lithium air battery electrolyte solvent recovery apparatus according to an exemplary embodiment of the present invention.

FIG. 4 is a diagram schematically illustrating the lithium air battery electrolyte solvent recovery apparatus 200 in the lithium air battery system 1000 according to the exemplary embodiment of the present invention.

The lithium air battery electrolyte solvent recovery apparatus 200 according to the exemplary embodiment of the present invention includes a reactor 210, a recovery part 220, an electrolyte solvent filter part 230, a gas intake pipe 240, and an electrolyte solvent transfer pipe 260.

The reactor 210 has a space part 211 disposed therein and the space part 211 forms a sealed space. The reactor 210, which is a space a mixed gas of electrolyte solvent steam evaporated in the electrolyte part 150 with air inside the lithium air battery 100 is introduced to separate the electrolyte solvent from the air, forms a sufficient space in which the introduced gas may react, in which the space part 211 is preferably sealed. In this case, the mixed gas of air and electrolyte solvent steam introduced into the reactor 210 is called mixed gas.

The recovery part 220, which is a space in which the electrolyte solvent separated and recovered from air in the reactor 210 is stored, is disposed under the reactor and is formed to communicate with the space part 211 of the reactor 210. In the lithium air battery electrolyte solvent recovery apparatus 200 according to the exemplary embodiment of the present invention, the recovery part 220 may be disposed under the reactor 210 to store the electrolyte solvent recovered by gravity without a special apparatus and the recovered electrolyte solvent may be easily transferred to the lithium air battery 100. In this case, the position of the lithium air battery 100 may be disposed at a position lower than the lithium air battery electrolyte solvent recovery apparatus 200.

Further, in the lithium air battery electrolyte solvent recovery apparatus 200 according to the exemplary embodiment of the present invention, the recovery part 220 is formed to be inclined down to concentrate the recovered electrolyte solvent at the lower portion of the recovery part 220. As a result, even when the amount of recovered electrolyte solvent is small, the recovered electrolyte solvent may be easily transferred to the lithium air battery 100.

The electrolyte solvent filter unit 230 is disposed inside the reactor 210 to separate the mixed gas incoming from the lithium air battery 100. That is, the electrolyte solvent steam is separated from the mixed gas and thus the electrolyte solvent becomes liquid. Further, the electrolyte solvent separated in the electrolyte solvent filter part 230 communicates with the space part 211 and is collected in the recovery part 220 which is disposed under the reactor 210.

Further, one end of the gas intake pipe 240 is connected to the air exhaust pipe 130 of the lithium air battery 100 and the other end thereof is connected to one side of the reactor 210. In this case, the gas intake pipe 240 is connected to one side of an upper portion of the reactor 210 to make the flow of the electrolyte solvent recovered by gravity more smooth.

One end of the electrolyte solvent transfer pipe 260 is connected to the recovery part 220 and the other end thereof is connected to the lithium air battery 100. The electrolyte solvent transfer pipe 260 is to inject the electrolyte solvent separated in the reactor 210 into the lithium air battery 100 again and the electrolyte solvent transfer pipe 260 may be provided with a check valve 261 to prevent the electrolyte solvent injected into the lithium air battery 100 from reflowing. In this case, the recovery part 220 is connected to the receiving part 111 and the electrolyte solvent transfer pipe 260 of the lithium air battery 100 to supplement the electrolyte solvent which is run out by being evaporated in the receiving part 111 of the lithium air battery 100

Therefore, in the lithium air battery system 1000 according to the exemplary embodiment of the present invention, the mixed gas including the electrolyte solvent evaporated inside the lithium air battery 100 is separated into the air and the electrolyte solvent in the electrolyte solvent filter unit and injects the separated electrolyte solvent into the lithium air battery again, thereby improving the stability of the lithium air battery 100.

Further, the lithium air battery system 1000 according to the exemplary embodiment of the present invention further includes the gas exhaust pipe 250 of which the one end is connected to the reactor 210 to discharge the gas passing through the electrolyte solvent filter part 230.

In this case, the gas exhaust pipe 250 is connected to the other side of the upper portion of the reactor 210 and is disposed at the other side of the gas intake pipe 240. Therefore, the mixed gas may be introduced into the reactor 210 to be separated into the air and the electrolyte solvent, the separated electrolyte solvent may be collected in the recovery part 220, and the air may be discharged through the gas exhaust pipe 250.

Further, the electrolyte solvent filter part 230 includes a first filter 231 provided in a sieve form and a second filter 232 provided in a pad form.

Here, the first filter 231 has the sieve form to pass the mixed gas through a lattice space and filter a condensed particle of the electrolyte solvent steam. In this case, the first filter 231 has the sieve form and thus is disposed in plural inside the reactor 210 and a lattice forming each of the first filters 231 may be formed differently. Further, the filter part 230 may be provided with a total four of first filters 231a, 231b, 231c, and 231d, including a first filter 231a which is disposed at an inlet introduced with the mixed gas from the lithium air battery 100, a first filter 231b disposed thereunder, a first filter 231d disposed at an outlet through which gas is discharged, and a first filter 231c disposed thereover. In this configuration, the first filter 231a disposed at the inlet has a largest lattice and the first filter 231d disposed at the outlet is the smallest lattice, in which the lattices forming the first filters 231a, 231b, 231c, and 231d may be densely formed from the inlet toward the outlet. That is, as the flow of the mixed gas is progressed, the lattice interval forming the first filters 231a, 231b, 231c, and 231d is narrow. That is, since the first filters 231a, 231b, 231c, and 231d through which the mixed gas passes have the lattice interval narrow from the inlet introduced with the mixed gas toward the outlet, the first filter 231a disposed at the inlet filters the largest condensed particles of the electrolyte solvent steam and the first filter 231d disposed at the outlet filters the smallest condensed particles of the electrolyte solvent steam. Therefore, the first filters 231a, 231b, 231c, and 231d stepwise filter and separate the electrolyte solvent from the largest condensed particles of the electrolyte solvent steam to the smallest condensed particles of the electrolyte solvent steam while the mixed gas moves from the inlet to the outlet, thereby more effectively recovering the electrolyte solvent.

Further, the second filter 232 has the pad form and is disposed in plural inside the reactor 210. The second filter 232 may be made of porous aluminum or stainless having a large specific surface area so as to condense the electrolyte solvent steam by intervening in the flow of gas and may be made of a ceramic material so as to minimize an effect of corrosion.

As described above, the electrolyte solvent filter part includes the first filter having the sieve form and the second filter having the pad form to effectively recover the electrolyte solvent steam from the mixed gas.

Further, the electrolyte solvent filter part 230 according to the exemplary embodiment of the present invention may further include a plurality of fixed walls 233 which are provided inside the reactor 210. That is, there is a need for a fixture to dispose the first filter 231 and the second filter 232 inside the reactor 210. Therefore, the electrolyte solvent filter part 230 may be firmly fixed by the fixed walls 233 which have a plate form.

Further, the electrolyte solvent filter part 230 is provided with the plurality of fixed walls 233 which are parallel with each other in a height direction of the reactor 210 and may be disposed so that the fixed walls 233 are spaced apart from each other. That is, the plurality of fixed walls 233 are fixed inside the space part 211 of the reactor 210 in parallel with each other in the height direction of the reactor 210 and the first filter 231 and the second filter 232 may be fixed between the fixed walls 233.

Further, in the electrolyte solvent filter part 230 according to the exemplary embodiment of the present invention, a portion of the fixed wall 233 is fixed to the lower portion of the reactor 210, the remaining portion thereof is fixed to the upper portion of the reactor 210, and the fixed wall 233 fixed to the lower portion of the reactor 210 and the fixed wall fixed to the upper portion of the reactor 210 may be alternately disposed. That is, the fixed wall 233 having the plate form is formed to partition the inside of the reactor 210, such that the mixed gas passes through the first filter 231 and the second filter 232 stepwise to recover the electrolyte solvent.

Further, the first filter 231 and the second filter 232 included in the electrolyte solvent filter part 230 may be alternately fixed between the fixed walls 233. That is, the electrolyte solvent filter part 230 may be formed to alternately pass the gas introduced from the lithium air battery 100 through the first filter 231 and the second filter 232.

Therefore, the lithium air battery electrolyte solvent recovery apparatus 200 according to the exemplary embodiment of the present invention may condense the electrolyte solvent steam existing in the mixed gas introduced from the lithium air battery 100 to more effectively recover the electrolyte solvent steam.

Figure 5:
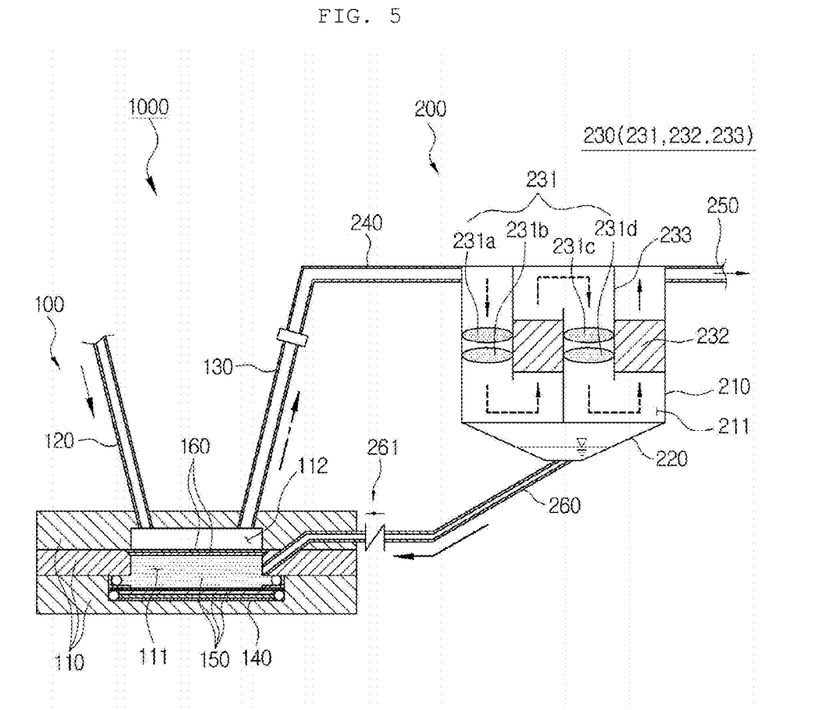
FIG. 5 is a diagram schematically illustrating a flow of air and an electrolyte solvent of a lithium air battery system according to an exemplary embodiment of the present invention.

FIG. 5 is a diagram schematically illustrating the flow of air and electrolyte solvent of the lithium air battery system 1000 according to the exemplary embodiment of the present invention and illustrate the flow of mixed gas, air, and electrolyte solvent in different arrows.

As illustrated in FIG. 5, in the lithium air battery system 1000 according to the exemplary embodiment of the present invention, the electrolyte solvent steam evaporated in the electrolyte part 150 which is included in the receiving part 111 of the lithium air battery 100 is evaporated toward the air receiving part 12 which is disposed on the porous cathode 160 and the mixed gas of air and electrolyte solvent steam is discharged along the air exhaust pipe 130 so as to be introduced into the reactor 210 through the gas intake pipe 240 of the lithium air battery electrolyte solvent recovery apparatus 200. Further, the mixed gas introduced into the reactor 210 passes through the electrolyte solvent filter part 230 and then is separated into the electrolyte solvent and the air, such that the electrolyte solvent is transferred to the recovery part 220 which is disposed under the reactor 210 and the air is discharged to the outside through the gas exhaust pipe 250.

Therefore, in the lithium air battery system 1000 according to the exemplary embodiment of the present invention, the mixed gas including the electrolyte solvent evaporated inside the lithium air battery 100 is stepwise separated into the air and the electrolyte solvent in the electrolyte solvent filter 230 to more effectively separate the electrolyte solvent and the electrolyte solvent is again injected into the lithium air battery 100 through the electrolyte solvent transfer pipe 260 to improve the stability of the lithium air battery 100.

The present invention is not limited to the above-mentioned exemplary embodiments but may be variously applied, and may be variously modified by those skilled in the art to which the present invention pertains without departing from the gist of the present invention claimed in the claims.

[Detailed Description of Main Elements]

- 1000: Lithium air battery system
- 100: Lithium air battery
- 110: Housing
- 111: Receiving part
- 112: Air receiving part
- 120: Air intake pipe
- 130: Air exhaust pipe
- 140: Lithium metal part
- 150: Electrolyte
- 160: Porous cathode
- 200: Lithium air battery electrolyte solvent recovery apparatus
- 210: Reactor
- 211: Space part
- 220: Recovery part

[Detailed Description of Main Elements] -continued

- 230: Electrolyte solvent filter
- 231: First filter
- 232: Second filter
- 233: Fixed wall
- 240: Gas intake pipe
- 250: Gas exhaust pipe
- 260: Electrolyte solvent transfer pipe
- 261: Check valve

The invention claimed is:

1. A lithium air battery system, comprising:
   a lithium air battery;
   a gas intake pipe into which a mixed gas of electrolyte solvent steam evaporated in the lithium air battery and air is introduced;
   a reactor having a space part disposed therein and connected to the gas intake pipe to introduce the mixed gas of electrolyte solvent steam and air into the space part;
   an electrolyte solvent filter part disposed inside the reactor to separate an electrolyte solvent from the mixed gas;
   a recovery part communicating with the space part of the reactor and disposed under the reactor; and
   a lithium air battery electrolyte solvent recovery apparatus including an electrolyte solvent transfer pipe which transfers the electrolyte solvent separated from the mixed gas to the recovery part to the lithium air battery.

2. The lithium air battery system of claim 1, further comprising:
   a gas exhaust pipe having one end connected to the reactor to discharge gas passing through the electrolyte solvent filter part.

3. The lithium air battery system of claim 1, wherein the electrolyte solvent filter part includes a first filter having a sieve form and a second filter having a pad form.

4. The lithium air battery system of claim 3, wherein the electrolyte solvent filter part further includes fixed walls having a plate form which are disposed inside the reactor and fix the first filter and the second filter.

5. The lithium air battery system of claim 4, wherein the electrolyte solvent filter part is provided with the plurality of fixed walls parallel with each other in a height direction of the reactor and is disposed so that the fixed walls are spaced apart from each other.

6. The lithium air battery system of claim 4, wherein in the electrolyte solvent filter part, a first fixed wall is fixed to an upper portion of the reactor and at least one fixed wall other than the first fixed wall is fixed to a lower portion of the reactor, wherein the first fixed wall and the at least one fixed wall other than the first fixed wall are alternately disposed.

7. The lithium air battery system of claim 4, wherein in the electrolyte solvent filter part, the first filter and the second filter are fixed between the fixed walls and are alternately disposed.

8. The lithium air battery system of claim 1, wherein the electrolyte solvent is an organic electrolyte solvent or an aqueous electrolyte solvent.

* * * * *

UNITED STATES PATENT AND TRADEMARK OFFICE
CERTIFICATE OF CORRECTION

PATENT NO. : 9,559,370 B2
APPLICATION NO. : 14/379942
DATED : January 31, 2017
INVENTOR(S) : Myoung Gu Park et al.

It is certified that error appears in the above-identified patent and that said Letters Patent is hereby corrected as shown below:

Column 1, Line 2, below "LITHIUM AIR BATTERY SYSTEM" insert -- CROSS-REFERENCE TO RELATED APPLICATIONS
This application is the United States national phase of International Application No. PCT/KR2012/011083 filed Dec. 18, 2012, and claims priority to Korean Patent Application No. 10-2012-0114112 filed Oct. 15, 2012, the disclosures of which are hereby incorporated in their entirety by reference. --

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*